United States Patent
Soeldner et al.

(10) Patent No.: US 12,445,456 B2
(45) Date of Patent: *Oct. 14, 2025

(54) METHOD FOR CONDUCTING A BIOPROCESS

(71) Applicant: Sartorius Stedim Biotech GmbH, Goettingen (DE)

(72) Inventors: Robert Soeldner, Goettingen (DE); Jonas Austerjost, Rietberg (DE); David James Pollard, Bohemia, NY (US)

(73) Assignee: Sartorius Stedim Biotech GmbH, Goettingen (DE)

( * ) Notice: Subject to any disclaimer, the term of this patent is extended or adjusted under 35 U.S.C. 154(b) by 285 days.

This patent is subject to a terminal disclaimer.

(21) Appl. No.: 18/029,280

(22) PCT Filed: Sep. 16, 2021

(86) PCT No.: PCT/EP2021/075495
§ 371 (c)(1),
(2) Date: Mar. 29, 2023

(87) PCT Pub. No.: WO2022/069244
PCT Pub. Date: Apr. 7, 2022

(65) Prior Publication Data
US 2023/0370475 A1    Nov. 16, 2023

(51) Int. Cl.
*H04L 9/40* (2022.01)
*G05B 19/042* (2006.01)
(Continued)

(52) U.S. Cl.
CPC .......... *H04L 63/126* (2013.01); *G05B 19/042* (2013.01); *H04L 9/3236* (2013.01);
(Continued)

(58) Field of Classification Search
CPC ... H04L 63/126; H04L 9/3236; H04L 9/3247; H04L 9/50; H04L 63/123; H04L 9/3239;
(Continued)

(56) References Cited

U.S. PATENT DOCUMENTS 7,188,362 B2 * 3/2007 Brandys ................ H04L 9/3247
726/28
8,719,576 B2    5/2014 Buldas et al.
(Continued)

FOREIGN PATENT DOCUMENTS

| CN | 110675150 | 1/2020 |
|---|---|---|
| EP | 2565832 | 3/2013 |
| WO | 2022069244 | 4/2022 |

OTHER PUBLICATIONS

"European Search Report," for European Patent Application No. EP 20199398 Mailed Mar. 11, 2021 (6 pages).
(Continued)

*Primary Examiner* — Ghodrat Jamshidi
(74) *Attorney, Agent, or Firm* — Pauly, Devries Smith & Deffner LLC

(57) ABSTRACT

A method for conducting a bioprocess with a digital control unit of a bioprocess arrangement, wherein the digital control unit comprises a local data storage and a local processor unit, wherein the digital control unit comprises a bioprocess interface for sending and receiving bioprocess control data, wherein bioprocess data are generated by the digital control unit, wherein a bioprocess control routine is executed by the local processor unit to control the bioprocess, wherein in the bioprocess control routine, the bioprocess data are generated by the digital control unit from actuator data and/or sensor data and/or user control command data. It is proposed that a signing routine is initiated by the local processor unit in the data safety routine to be executed by an external signing unit(s).

22 Claims, 3 Drawing Sheets

(51) Int. Cl.
*H04L 9/32* (2006.01)
*H04L 67/125* (2022.01)

(52) U.S. Cl.
CPC .......... *H04L 9/3247* (2013.01); *H04L 63/123* (2013.01); *H04L 67/125* (2013.01); *G05B 2219/24167* (2013.01); *G05B 2219/25205* (2013.01)

(58) Field of Classification Search
CPC ..... H04L 67/125; H04L 67/12; G05B 19/042; G05B 2219/25205; G05B 2219/24167; G06F 21/64; G06F 21/645
See application file for complete search history.

(56) References Cited

U.S. PATENT DOCUMENTS

| | | | |
|---|---|---|---|
| 8,846,383 B2 | 9/2014 | Luttmann et al. | |
| 10,521,789 B2* | 12/2019 | Cho | G06Q 20/322 |
| 10,956,549 B2* | 3/2021 | Li | H04L 63/0861 |
| 10,963,715 B2* | 3/2021 | Li | G06V 40/70 |
| 12,198,138 B1* | 1/2025 | Trinh | G06Q 20/3821 |
| 2004/0039706 A1* | 2/2004 | Skowron | G06Q 10/10 705/51 |
| 2011/0066859 A1* | 3/2011 | Iyer | H04W 12/106 713/181 |
| 2015/0237046 A1* | 8/2015 | Chang | G06F 21/32 726/7 |
| 2015/0324568 A1* | 11/2015 | Publicover | G06F 21/316 726/19 |
| 2016/0364559 A1* | 12/2016 | Bali | G06F 21/62 |
| 2018/0057271 A1* | 3/2018 | Vitalini | B65G 47/31 |
| 2018/0109947 A1* | 4/2018 | Kim | H04W 12/041 |
| 2020/0145219 A1* | 5/2020 | Sebastian | H04L 9/50 |

OTHER PUBLICATIONS

"International Search Report and Written Opinion," for PCT Application No. PCT/EP2021/075495 Mailed Jan. 4, 2022 (15 pages).
"Your Guide to Upstream Processing Solutions From Research to Production," Sep. 1, 2016, retrieved from the internet on Jan. 22, 2018, URL <https://www.connect-upstream.com/fileadmin/media/pdf/Cata_Upstream_S--1526-e.pdf> pp. 88, 89, 102-104 (108 pages).

* cited by examiner a)

b)

METHOD FOR CONDUCTING A BIOPROCESS

CROSS-REFERENCE TO RELATED APPLICATIONS

This application is a national stage application under 35 U.S.C. 371 of International Patent Application Serial No. PCT/EP2021/075495, entitled "Method for Conducting a Bioprocess," filed Sep. 16, 2021, which claims priority from European Patent Application No. EP 20199398.7, filed Sep. 30, 2020, the disclosure of which is incorporated herein by reference.

FIELD OF THE TECHNOLOGY

Various embodiments relate to a method for conducting a bioprocess with a digital control unit, a digital control unit of a bioprocess arrangement for controlling a bioprocess, a control system with a digital control unit, a data processing system, a computer program product and a computer readable storage media.

BACKGROUND

For at least partly automatically controlling a bioprocess, the digital control unit in question comes into play. An example for such a digital control unit, which is the starting point for the disclosure, is shown in DE 102 37 082 A1. The known digital control unit comprises all electronic components to control the bioprocess, to receive sensor data and to communicate with the user via a user interface. This allows to execute a bioprocess control routine, in which bioprocess data are being generated in order to document the real life execution of the desired bioprocess.

The above noted bioprocess data are particularly important, for example, if a new pharmaceutical product is subject of a compliance procedure before its introduction into the market. Such compliance procedures often require proof, that the respective process in the bioprocess laboratory is in accordance with predefined rules. For instance during clinical trials this is of particular importance due to quality control standards and regulatory measures in clinical research, which are required by the respective national drug agency, such as the FDA, for the approval process of new drugs. However, this does not only concern the experimental phase, in which the documentation of process steps and sensor data is predominantly relevant, but also the manufacturing phase, in which the documentation of process quality plays an important role according to GMP standards. GMP, or good manufacturing practice, are the practices required to conform to the guidelines recommended by agencies such as the FDA that control the authorization and licensing of the manufacture and sale of pharmaceutical products. These guidelines define the minimal manufacturing requirements that must be fulfilled in order to assure that the respective product is high in quality for their intended use. The accordance with GMP standards is overseen by regulatory agencies all over the world.

In any of the above noted cases, the integrity of the bioprocess data is necessary. This means that it has to be ensured that the bioprocess data have not been manipulated, be it willingly or unwillingly.

In order to ensure the integrity of the bioprocess data, it has been proposed to submit the respective data in online calendars and externally signing the data applying a generally known signing method (U.S. Pat. No. 8,719,576 B2). This known concept leaves room to manipulate the bioprocess data within the bioprocess laboratory.

SUMMARY

The term "bioprocess" presently represents biotechnological and biopharmaceutical processes, which are involved in the manufacturing of desired therapeutic bioproducts such as biologics, vaccines, components for cell or gene therapy, or of non-therapeutic bioproducts such as pigments, biofuels or nutritional supplements. Such bioproducts can either be manufactured by living cells, or the cell itself might be the bioproduct, or the bioproduct can be the result of a cell free manufacturing based on cell components that are of either natural or non-natural origin.

The "bioprocess arrangement" comprises at least one device or the combination of two or more devices involved in the bioprocess, such as a bioreactor, a digital control unit (DCU), a filtration device, chromatography equipment, a centrifuge, a freeze dryer and analytical devices, which might be either single-use or multi-use equipment.

It is an object of the present disclosure to provide means that improve the data integrity relating to bioprocess data, that have been generated in a bioprocess, with low effort.

The above noted problem is solved for a digital control unit with various features described herein.

First of all, it has been found out that the data integrity of the bioprocess data may be positively affected by a component, which is present in almost any bioprocess arrangement for controlling a bioprocess. This component, according to some embodiments, is the digital control unit of a bioprocess arrangement, which is the central electronic component for controlling the bioprocess. The expression "control" presently includes any action that attributes to influencing the respective target, here the bioprocess, in a reproducible manner, which generally includes sending out data to the target and retrieving and storing data from the target.

The digital control unit comprises a local data storage and a local processor unit, which presently are to be considered the core components for digital data processing.

The digital control unit further comprises a bioprocess interface for sending and receiving bioprocess control data, which bioprocess interface comprises an actuator interface for sending actuator data to at least one actuator for influencing the bioprocess and a sensor interface for receiving sensor data related to the bioprocess from at least one sensor. For instance, a stirrer or a valve could be such actuators, while the associated, respective actuator data could be the stirring frequency in rounds per minute (rpm), or the fluid flow in milliliter per minute (mL/min), respectively. Exemplary sensors could be the biomass sensor, pH sensor or oxygen sensor, reflecting the respective data.

The digital control unit also generates bioprocess data, which serve to describe the bioprocess as will be explained. These bioprocess data are the basis for the documentation, which is needed for above noted compliance procedures.

Further, the digital control unit comprises a user interface for displaying to a user at least part of the bioprocess data and for receiving user control command data. The user interface provides one possibility for the user to influence the bioprocess during both, the experimental development phase as well as the manufacturing phase. Common, exemplary parameters that are set by the user are stirring speed, temperature, pH, oxygen saturation and the like.

Finally, the digital control unit is configured to execute a bioprocess control routine via the local processor unit to control the bioprocess. Here, all automation takes place, if needed. In the bioprocess control routine, the digital control unit receives the sensor data from the sensor. In addition, in the bioprocess control routine, the digital control unit generates the actuator data based on the user control command data and/or the sensor data and controls the actuator by sending the actuator data to the actuator thereby influencing the bioprocess. This control may be based on a simple logic operation between the user control command data and/or the sensor data to derive the actuator data. It may also be based on a control loop, that derives actuator data in order to reach a certain target value. Finally, it may be based on a sequence control, that is usually realized by a software noted below. Accordingly, the digital control unit may provide a coordination function for the whole bioprocess on the one hand, and may also be only an execution tool to execute requests from at least one other control unit on the other hand.

In the bioprocess control routine, the digital control unit also generates the bioprocess data from the actuator data and/or the sensor data and/or the user control command data.

The overall concept underlying some embodiments is now to execute the signing routine by an external signing unit and, however, to have this signing routine initiated by the local processor unit of the digital control unit.

The expression "external" throughout this document means a unit or step located or executed outside the digital control unit.

The expression "initiate" with respect to a routine means that the execution of the routine is being started immediately or with a certain time lag. In any case, the initiation of a routine always leads to the subsequent execution of the routine.

According to the proposed teaching, the digital control unit is responsible for performance of the above noted signing routine. This means, that the probability of the data stream being compromised between the digital control unit and the external signing unit is lowered once more.

In detail, private key data are stored in an external signing unit, which is the basis for the execution of a data safety routine. The local processor unit initiates this data safety routine, such that the control of the whole data safety routine stays within the local processor unit.

In the data safety routine, the local processor unit initiates a documentation routine to be executed by the local processor unit itself or by an external documentation unit. The expression "to be executed" in this context means that the above noted initiation is performed such that the respective routine, here the documentation routine, is being executed by the respective external unit, here the documentation unit. For this, within the initiation, for example a request may be transmitted from the initiating unit, here the local processor unit, to the executing unit, here the documentation unit, via a data connection.

In the documentation routine, documentation data are generated from the bioprocess data by the local processor unit or the external documentation unit. These documentation data are subject to signature to be explained in the following.

A signing routine is initiated by the local processor unit in the data safety routine, which signing routine is to be executed by an external signing unit. In the signing routine, a cryptographic private key is extracted from the private key data by the external signing unit. The documentation data are then digitally signed with the cryptographic private key by generating a digital signature. In short, in the signing routine, which is performed completely in the external signing unit, a digital signature of the documentation data is performed based on asymmetric cryptography, which as such is well known from the state of the art. With the signing routine being executed in an external signing unit, which may well be a globally trusted unit, a high level of safety in view of data integrity may be achieved, as far as the signing routine as such is concerned. With the proposed control of the whole signing process by the digital control unit, as noted above, also the data stream between the digital control unit and the external signing unit is considerably safe in view of data integrity as well. This is particularly true as the digital control unit in question is the one electronic control member, which is the closest to the sensors and actuators of the bioprocess arrangement, such that there remains hardly any opportunity to manipulate relevant bioprocess data. With the proposed solution, there is also no need for complex concepts such as distributed ledger technology (DLT), which require a consensus algorithm such as proof of work or proof of stake.

The above noted extraction of the cryptographic private key from the private key data is particularly simple, if the private key data include the cryptographic key or are even identical to the cryptographic private key. However, the extraction may be more complex. For example, the cryptographic private key may be derived from the private key data based on an unpredictable random number.

As the data safety routine may be designed, such that very little data processing is needed for generating the documentation data, the proposed solution may be realized with a wide range of existing digital control units without even adding any additional hardware. This is not only a cost advantage, but also facilitates the introduction of the proposed solution into existing laboratories.

According to various embodiments, the external documentation unit and/or the external signing unit may be provided by any unit outside the digital control unit, in particular by a laboratory control system or a cloud service. Independent from that, it can be that the external documentation unit and the external signing unit are provided by one single external unit, such as by one and the same data processor of this single external unit. Here it becomes clear, that the above noted, high level of data integrity is being provided, still leaving room for flexibility with regard to the detailed realization of the data safety routine.

According to various embodiments, in the documentation routine, the bioprocess data are grouped into data blocks, which data blocks are then processed in a step of hashing. According to various embodiments, the data blocks are being hashed in form of a tree structure such as a Merkle tree structure. The signing of these documentation data, which may include the complete hash tree structure or which may also include only the hash root, in any case require only little data processing as noted above.

Various embodiments are directed to variants regarding the data stream of the bioprocess data. In order to prevent manipulation of the bioprocess data, the documentation routine and, in some embodiments, also the signing routine are being initiated during control of the bioprocess in the bioprocess control routine. This is advantageous in particular in view of the signing routine, as after executing the signing routine, no unnoticed amendment of the bioprocess data is possible.

Various embodiments are directed to more than one signing routine being initiated within the bioprocess. Here, it can be that subsequent bioprocess data sets, that are assigned to subsequent signing routines, are linked to each other one way or another, in order to ensure that no data between two subsequent bioprocess data sets are being missed. In any case in various embodiments, in the signing routine, the external signing unit adds time stamps to the documentation data. Here, time information in the external signing unit provides the necessary reference.

In order to further reduce the opportunity to manipulate the bioprocess data, according to various embodiments, the sensor data and/or the user control command data are protected from external manipulation, after receipt by the digital control unit. As an alternative or in addition, the local data storage is protected accordingly as well. For this, it can be provided that via the user interface and also via any other interface, these data may not be amended.

There are various embodiments possible for the generation of the bioprocess data. Besides simply sequentially arranging the respective sensor data, actuator data and user control command data, it is well possible to generate a link information regarding a logical relation between at least part of these data and to generate the bioprocess data also based on this link information. This link information may, for example, be the logical relation between controlling an actuator and the expected change in sensor data.

Various embodiments are directed to structural setups regarding the digital control unit. Here it becomes clear that the digital control unit in question provides process-oriented control structures such as a control loop and that even the hardware of the digital control unit is directly linked to the bioprocess. The intermediate link between the digital control unit and the sensor and/or actuator can be made explicit with the direct data-wise connection between the bioprocess interface to the sensor and/or the actuator. The expression "direct" means, that no data processing is taking place between the sensor and/or actuator and the bioprocess interface.

The digital signature generated based on the documentation data may be stored in the local data storage of the digital control unit. It may also be stored in any other data storage, that is connected to the digital control unit via a data transmission interface. Both possibilities are subject to embodiments that clarify, that after executing the signing routine, unnoticed manipulation of the bioprocess data is not possible as noted above, such that the location of storage of the digital signature does not play any role.

According to various embodiments, the proposed digital control unit is provided as such, which is configured to perform the above noted, proposed method for conducting a bioprocess. Reference may be made to all explanations given with regard to the proposed method.

According to various embodiments, a control system with a proposed digital control unit and an external documentation unit and/or an external signing unit to execute the above noted, proposed method. Again, reference may be made to all explanations given with regard to the proposed method.

Various embodiments are directed to the data processing system for the realization of the proposed method, in particular for the realization of the respective routines. In some embodiments, this data processing system comprises at least the local data storage and the local processor unit of the digital control unit. All explanations given with regard to the proposed digital control unit are again fully applicable to the proposed data processing system.

According to various embodiments, a computer program product for the proposed data processing system is provided as such. The computer program product is configured to realize the proposed method, in particular, to realize the above noted routines. Again, all explanations given for the proposed method are fully applicable to the proposed computer program product.

According to various embodiments, a computer readable storage media, on which the computer program is stored, is provided as such. Again all explanations given for the proposed method are fully applicable to the proposed readable storage media.

Finally, the proposed bioprocess arrangement shall be able to be provided as such. The proposed bioprocess arrangement can include a bioreactor and all components and/or devices performing the corresponding upstream- and downstream processing phases.

The upstream processing phase of a bioprocess generally consists of all actions and workflows from the development, optimization, screening and selection of a strain or cell line to its cultivation and the manufacturing of the desired bioproduct by the cell or cell components. This cultivation can be performed in various scales (microliter scale to several thousands of liters scale) using different reactor setups and geometries (rocking motion, stirred tank, bubble column, fixed bed, etc.) by applying different modes of operation (batch, fed-batch, continuous, in particular perfusion, or combinations thereof). The cultivation is usually monitored, analyzed and controlled based on different sensor technologies (soft, electrochemical, biochemical, optical, etc.; offline, online, inline, atline). Typically, after the manufacturing of a desired bioproduct, it is purified. Here, the cultivation broth is separated from the desired bioproduct (e. g. monoclonal antibodies, polyketides, enzymes, vaccines).

The downstream processing phase of a bioprocess generally includes various techniques and methods for recovery, purification, analysis and characterization of the desired bioproduct. It involves methods, such as cell disruption, sedimentation, centrifugation, precipitation, crystallization, extraction, filtration, adjustment of pH and conductivity of liquids, enzymatic or chemical modification, dilution, buffer exchange, evaporation, adsorption and chromatography. Analysis and characterization steps may be included to ensure the purified bioproduct is compliant to critical quality attributes (e.g. glycosylation patterns of antibodies, concentration of endotoxins). A final formulation step, which involves buffer exchange, drying, freeze-drying or crystallization, might be performed to bring the purified bioproduct in a suitable state for storage and distribution before it is filled and packaged.

Another variant includes an arrangement performing an upstream process, which is continuously connected to a downstream arrangement.

All explanations given regarding the proposed process, the proposed digital control unit, the proposed control system, the data processing system, the computer program product and the computer readable storage media are fully applicable to the bioprocess arrangement.

Various embodiments provide a method for conducting a bioprocess with a digital control unit of a bioprocess arrangement, wherein the digital control unit comprises a local data storage and a local processor unit, wherein the digital control unit comprises a bioprocess interface for sending and receiving bioprocess control data, wherein the bioprocess interface comprises an actuator interface for sending actuator data to at least one actuator for influencing the bioprocess, wherein the bioprocess interface comprises a sensor interface for receiving sensor data related to the bioprocess from at least one sensor, wherein bioprocess data are generated by the digital control unit, wherein the digital control unit comprises a user interface for displaying to a user at least part of the bioprocess data and for receiving user control command data, wherein a bioprocess control routine is executed by the local processor unit to control the bioprocess, wherein in the bioprocess control routine, the sensor data are received by the digital control unit from the sensor, wherein in the bioprocess control routine, the actuator data are generated by the digital control unit based on the user control command data and/or the sensor data and the actuator is controlled by the digital control unit by sending the actuator data to the actuator thereby influencing the bioprocess, wherein in the bioprocess control routine, the bioprocess data are generated by the digital control unit from the actuator data and/or the sensor data and/or the user control command data, wherein private key data are stored in an external signing unit, that a data safety routine is initiated by the local processor unit, that a documentation routine is initiated by the local processor unit in the data safety routine to be executed by the local processor unit or an external documentation unit, that in the documentation routine, documentation data are generated from the bioprocess data by the local processor unit or the external documentation unit, that a signing routine is initiated by the local processor unit in the data safety routine to be executed by an external signing unit and that in the signing routine, a cryptographic private key is extracted from the private key data by the external signing unit and that the documentation data are digitally signed by the external signing unit with the cryptographic private key by generating a digital signature.

In various embodiments, the external documentation unit and/or the external signing unit is provided by a laboratory process control system or a cloud service instance.

In various embodiments, the data connection between the digital control unit on the one hand and the external documentation unit and/or the external signing unit on the other hand is realized using a message authentication code.

In various embodiments, the documentation routine comprises a step of grouping the bioprocess data into data blocks and a step of hashing the data blocks generating hashes of the data blocks and that the documentation data are generated from the hashes of the data blocks.

In various embodiments, the documentation routine comprises a step of hashing the hashes of the data blocks in form of a tree structure, in particular a Merkle tree structure, into a hash root and that the documentation data are generated from the hash root.

In various embodiments, the digital control unit initiates the documentation routine and, in some embodiments, the signing routine, to be executed during control of the bioprocess in the bioprocess control routine.

In various embodiments, the step of grouping the bioprocess data into data blocks and/or the step of hashing the data blocks is/are initiated with the start of the bioprocess.

In various embodiments, during a single bioprocess the digital control unit continuously receives the sensor data from the sensor in the bioprocess control routine and continuously sends actuator data to the actuator thereby influencing the bioprocess and that the signing routine is initiated a first time and at least a further time, each time to be executed during a single bioprocess, wherein a subsequent signing routine, which is based on a subsequent bioprocess data set, is being executed subsequently to a previous signing routine, which is based on a previous bioprocess data set.

In various embodiments, the respective previous bioprocess data set and the respective subsequent bioprocess data set are overlapping each other.

In various embodiments, the digital control unit or the external documentation unit adds an identifier of the respective previous bioprocess data set to the respective subsequent bioprocess data set.

In various embodiments, in the signing routine, the external signing unit adds time stamps to the documentation data.

In various embodiments, after receipt by the digital control unit, the sensor data and/or the user control command data are protected from external manipulation, and/or, that the local data storage is protected from external manipulation.

In various embodiments, in the bioprocess control routine, the digital control unit generates the bioprocess data based on the sensor data and/or the actuator data and/or the user control command data.

In various embodiments, in the bioprocess control routine, the digital control unit generates a link information regarding a logical relation between at least part of the sensor data and/or the actuator data and/or the user control command data and generates the bioprocess data also based on the link information.

In various embodiments, the digital control unit is configured to execute a feedback routine for realizing a control loop thereby influencing the bioprocess.

In various embodiments, the digital control unit has a casing, that the local processor unit and the local data storage are completely located in or on the casing, and/or, that the digital control unit is a mobile unit that can be moved with the local processor unit and the local data storage through a laboratory, and/or, that the bioprocess interface is connected via, in particular electrical, cables and/or short range wireless communication to the sensor and/or the actuator, and/or, that the user interface comprises a user display and a user input device, in particular a touch screen, located in or on the casing.

In various embodiments, the bioprocess interface comprises a direct, electrical data-wise connection to the sensor and/or the actuator.

In various embodiments, the digital signature generated by signing the documentation data is received from the digital control unit via the bioprocess interface, such as a data transmission interface, and stored in the local data storage, and/or, that the digital control unit initiates the transmission of the digital signature and/or the documentation data and/or the bioprocess data or parts of the respective data to an external data storage, in particular a laboratory process control system, via the data transmission interface.

Various embodiments provide a digital control unit of a bioprocess arrangement for controlling a bioprocess, wherein the digital control unit comprises a local data storage and a local processor unit, wherein the digital control unit comprises a bioprocess interface for sending and receiving bioprocess control data, wherein the bioprocess interface comprises an actuator interface for sending actuator data to at least one actuator for influencing the bioprocess, wherein the bioprocess interface comprises a sensor interface for receiving sensor data related to the bioprocess from at least one sensor, wherein the digital control unit generates bioprocess data, wherein the digital control unit comprises a user interface for displaying to a user at least part of the bioprocess data and for receiving user control command data, wherein the digital control unit is configured to execute a bioprocess control routine via the local processor unit to control the bioprocess, wherein in the bioprocess control routine, the digital control unit receives the sensor data from the sensor, wherein in the bioprocess control routine, the digital control unit generates the actuator data based on the user control command data and/or the sensor data and controls the actuator by sending the actuator data to the actuator thereby influencing the bioprocess, wherein in the bioprocess control routine, the digital control unit generates the bioprocess data from the actuator data and/or the sensor data and/or the user control command data, wherein private key data are stored in an external signing unit, that the digital control unit is configured to initiate a data safety routine via the local processor unit, that the digital control unit is configured to initiate a documentation routine via the local processor unit in the data safety routine to be executed by the local processor unit or an external documentation unit, that in the documentation routine, the local processor unit or the external documentation unit generates documentation data from the bioprocess data, that the digital control unit is configured to initiate a signing routine via the local processor unit in the data safety routine to be executed by an external signing unit and that in the signing routine, the external signing unit extracts a cryptographic private key from the private key data and digitally signs the documentation data with the cryptographic private key by generating a digital signature.

Various embodiments provide a control system with a digital control unit according to the disclosure and an external documentation unit and/or an external signing unit to execute a method according to the disclosure.

Various embodiments provide a data processing system for realizing the method according to the disclosure.

Various embodiments provide a computer program product for the data processing system according to the disclosure.

Various embodiments provide a computer readable storage media, on which the computer program product according to the disclosure is stored, such as in a non-volatile manner.

BRIEF DESCRIPTION OF THE DRAWINGS

In the following, various embodiments are explained with respect to the drawings. The drawings show FIG. 1 a proposed digital control unit of a proposed control system for executing a proposed method for conducting a bioprocess, FIG. 2 the working principle of the digital control unit according to FIG. 1 including a bioprocess control routine and a data safety routine and FIG. 3 a hash tree structure a) as generated in the data safety routine according to FIG. 2 and b) a respective hash tree structure based on manipulated bioprocess data.

DETAILED DESCRIPTION

The proposed digital control unit 1 of a bioprocess arrangement 2 serves for controlling a bioprocess such as a cultivation process of microorganisms or mammalian cells using a bioreactor 3 and components for the corresponding upstream and downstream process (not displayed).

Figure 1:
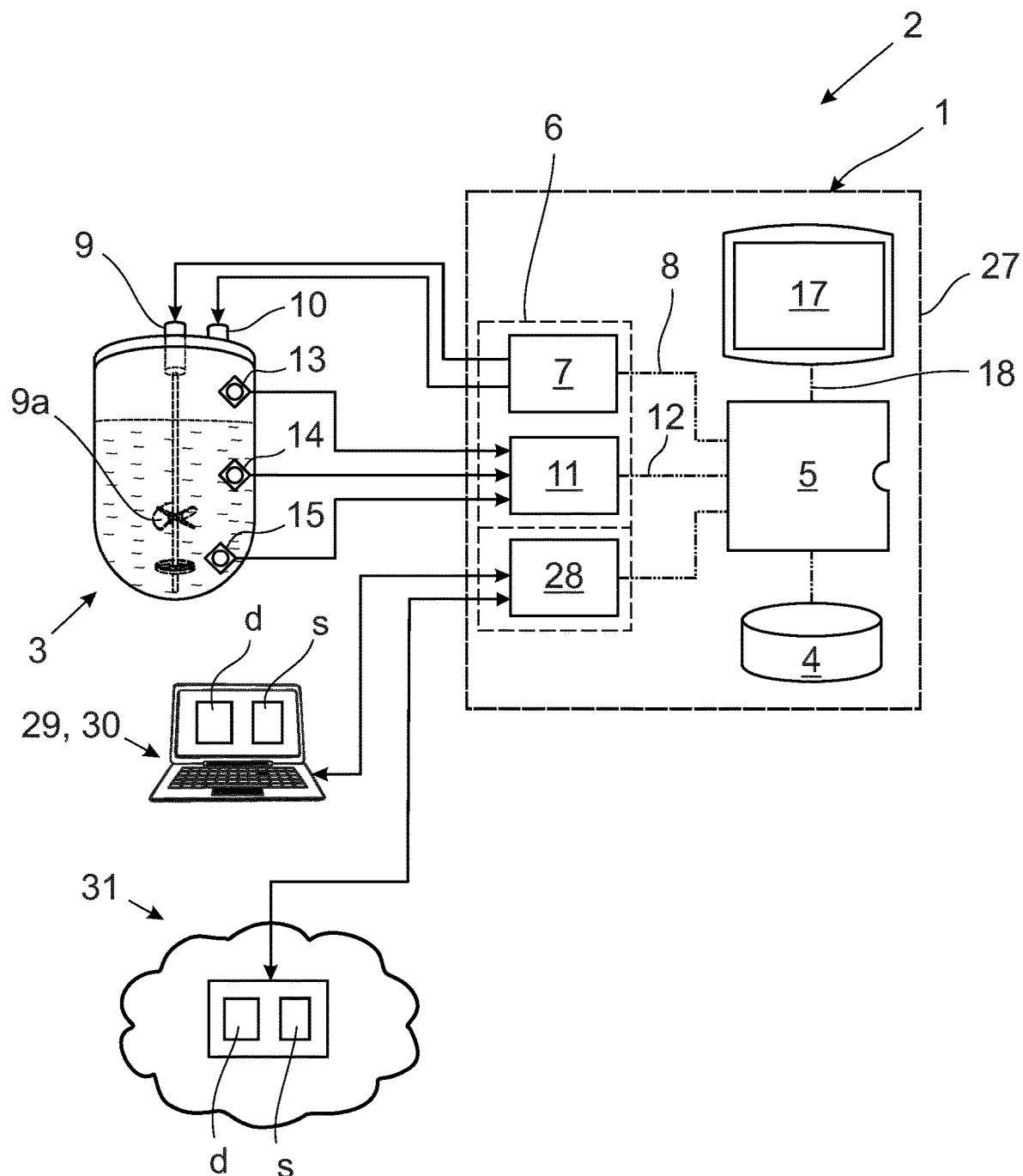

As shown in FIG. 1, the digital control unit 1 comprises a local data storage 4 and a local processor unit 5 for data processing. Both units 4, 5, namely the local data storage 4 and the local processor unit 5, are realized as electronic components. It may be pointed out, that the local processor unit 5 can include only one data processor, which performs all functions of the digital control unit 1. However, it may be provided, that the local processor unit 5 comprises more than one data processor, that interact with each other in order to perform all functions of the digital control unit 1.

As also shown in FIG. 1, the digital control unit 1 comprises a bioprocess interface 6 for sending and receiving bioprocess control data. In particular, the bioprocess interface 6 comprises an actuator interface 7 for sending actuator data 8 to at least one actuator 9, 10 for influencing the bioprocess. The actuator 9, 10 is to be understood as any component, that may be controlled to be actuated, in order to influence the bioprocess. Here, the actuator 9 is a stirrer comprising an impeller 9a within the bioreactor 3, while the actuator 10 can be a valve for introducing fluid, such as a nutrient solution, into the bioreactor 3. Other possible actuators are pumps, liquid handling units, heating and/or cooling systems, or the like. It may be pointed out that the bioprocess arrangement 2 may comprise any number of actuators 9, that each may be controlled by the actuator data 8. Furthermore, the bioprocess arrangement is not limited to upstream devices.

The bioprocess interface 6 also comprises a sensor interface 11 for receiving sensor data 12 related to the bioprocess from at least one sensor 13, 14, 15. Such sensor 13, 14, 15 may be any sensor relevant to describe the bioprocess such as the biomass sensor, pH sensor or oxygen sensor, or the like. The function of these sensors may well be provided by soft sensors, that are also called "virtual sensors". Soft sensors derive sensor values from other sensing sources based on a data model. Depending on the application, there are various possibilities to realize the necessary data processing hardware assigned to the respective soft sensor.

A sensor 13, 14, 15 in the above noted sense may be provided with its own sensor interface 11, that allows its connection to the bioprocess interface 6, such as its sensor interface 11, for the transfer of sensor data 12. Depending on its working principle, the sensor 13, 14, 15 may be connected to the sensor interface 11 of the bioprocess interface 6 for example via an electric, an optic, a pneumatic or a hydraulic connection. In the embodiment shown in FIG. 1 and only as an example, an electric connection is indicated. Again, the bioprocess arrangement 2 may comprise any number of sensors 13, 14, 15, which each provide sensor data 12 to the digital control unit 1.

The digital control unit 1 generates bioprocess data 16, that serve to describe the bioprocess and that will be described in the following. The bioprocess data 16, just after their generation, are adding up to a continuous data stream S shown in FIG. 2.

The digital control unit 1 also comprises a user interface 17 for displaying to a user at least part of the bioprocess data 16 and for receiving the user control command data 18. These user control command data 18 may be a command to start and terminate the bioprocess and/or to set certain control parameters such as the stirring speed of the impeller 9a, which the actuator 9 is assigned to.

Figure 2:
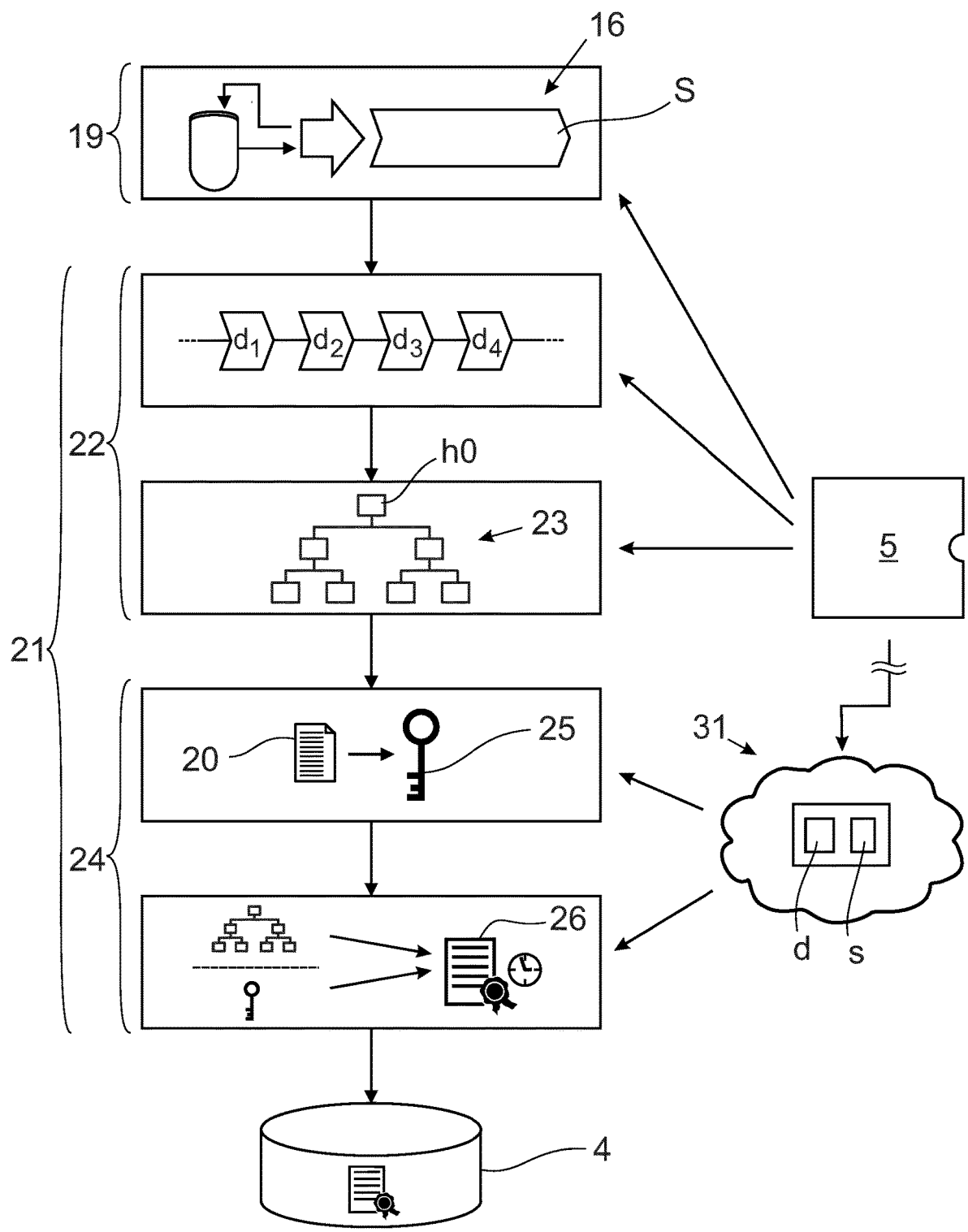

Further, the digital control unit 1 is configured to execute a bioprocess control routine 19 via the local processor unit 5 to control the bioprocess. This is indicated in FIG. 2 as well. In the bioprocess control routine 19, the digital control unit 1 receives the sensor data 12 from the respective sensor 13, 14, 15. In the bioprocess control routine 19, the digital control unit 1 also generates the actuator data 8 based on the user control command data 18 and/or the sensor data 12 and controls the actuator 9, 10 by sending the actuator data 8 to the actuator 9, thereby influencing the bioprocess. From the actuator data 8 and/or the sensor data 12 and/or the user control command data 18, in the bioprocess control routine 19, the digital control unit 1 generates the bioprocess data 16.

The bioprocess control routine 19 can be based on a control software running on the local processor unit 5, which may be structured as a sequence program, which may include rules to control the actuator 9, 10, control loops or the like.

As noted above, according to various embodiments, data integrity with respect to the bioprocess data 16 is ensured by applying asymmetric cryptography, which is being controlled by the digital control unit 1 and which is being executed by an external signing unit s. For this, first of all, private key data 20 are stored in the external signing unit s. Second, the digital control unit 1 is configured to initiate a data safety routine 21 via the local processor unit 5. The data safety routine 21 is relying on a safety software, which is run on the local processor unit 5 as well.

The safety routine 21 includes a documentation routine 22. In detail, the digital control unit 1 is configured to initiate the documentation routine 22 by the local processor unit 5 within the data safety routine 21, which documentation routine 22 is executed by the local processor unit 5 or an external documentation unit d. In this documentation routine 22, documentation data 23 are generated from the bioprocess data 16 by the local processor unit 5 or an external documentation unit d, which documentation data 23 are subject to digital signing.

In various embodiments, the data safety routine 21 includes a signing routine 24. Accordingly, the digital control unit 1 is configured to initiate the signing routine 24 to be executed by the external signing unit s in the data safety routine 21 and that in the signing routine 24, a cryptographic private key 25 is extracted from the private key data 20 by the external signing unit s. The documentation data 23 are then signed with the cryptographic private key 25 by generating a digital signature 26.

It is further, that the data connection between the digital control unit 1 on the one hand and the external documentation unit d and/or the external signing unit s on the other hand can be realized using a message authentication code (MAC). This not only encrypts the relevant data, but also ensures data integrity. The latter may be realized by separately signing the relevant data by the digital control unit 1 with a cryptographic private key stored in the local data storage 4, before transmitting these data to the external signing unit s.

As indicated in FIG. 2, the documentation routine 22 comprises a step of grouping the bioprocess data 16 into data blocks $d_i$ and a step of hashing the data blocks $d_i$ generating hashes $h_i$ of the data blocks $d_i$, wherein the documentation data 23 are generated from the hashes $h_i$ of the data blocks $d_i$. In some embodiments, the documentation routine 22 comprises a step of hashing the hashes $h_i$ of the data blocks $d_i$ in form of a tree structure applying a standard hash function. The resulting hash tree H is shown in FIG. 3a). Here, this tree structure is a Merkle tree structure.

It can be that the data blocks $d_i$ are hashed in form of a tree structure into a hash root h0, wherein the documentation data 23 are generated from the hash root h0. In a particularly simple variant, the documentation data 23 are identical to the hash root h0.

An important advantage of the above noted hashing is the fact that any and all amendments of the data blocks $d_i$ will lead to a corresponding amendment of the hash root h0, such that any amendment in the data blocks $d_i$ after hashing may easily be detected. A further advantage is the fact that it is only the hash root h0, that has to be introduced into the documentation data 23, which leads to easy data handling with low data processing requirements.

For the above noted hashing, various algorithms may be applied. Here, the hash algorithms "SHA-1", "SHA-2", "BLAKE2" may be applied. For the above noted signing, such as, an elliptic curve digital signature algorithm, in particular the signature algorithm "ECDSA", may be applied.

In order to reduce the opportunity for manipulating the bioprocess data 16 as much as possible, the digital control unit 1 may execute the documentation routine 22 during control of the bioprocess in the bioprocess control routine 19. This may also be done by the external signing unit s as noted above.

Especially during long term bioprocesses, that may extend over a number of days or even weeks, it can be that the signing routine 24 is executed more than once during the single bioprocess. Here, during at least part of the single bioprocess, the digital control unit 1 continuously receives the sensor data 12 from the sensor 13, 14, 15 in the bioprocess control routine 19 and continuously sends actuator data 8 to the actuator 9, 10 thereby influencing the bioprocess. The term "continuously" here generally means, that the respective actions, here the reception of sensor data 12 and the sending of actuator data 8, are being ongoingly and systematically, such as periodically, repeated.

The step of grouping the bioprocess data 16 into data blocks $d_i$ and/or the step of hashing the data blocks $d_i$ can be initiated with the start of the bioprocess. Here, the signing routine 24 is executed a first time and at least a further time during the single bioprocess, wherein a subsequent signing routine 24, which is based on a subsequent bioprocess data step, is being executed subsequently to a previous signing routine 24, which is based on a previous bioprocess dataset. Here, the respective previous bioprocess dataset and the respective subsequent bioprocess dataset are overlapping each other, such that it is ensured that all data of the bioprocess data 16 are being included into the signing routine 24.

In order to ensure, that the documentation data 23 represent the sequence of the bioprocess data correctly, it may also be provided, that the digital control unit 1 or the external documentation unit d adds an identifier of the respective previous bioprocess dataset to the respective subsequent bioprocess dataset.

For the same reason it may also be provided that in the signing routine 24, the digital control unit 1 or the external signing unit s adds time stamps to the documentation data 23. This time stamp accordingly relates to the time of executing the signing routine 24. As an alternative or in addition, the bioprocess data 16 may include a time stamp for each bioprocess data item defining its creation.

In order to further prevent a manipulation of bioprocess data 16, it can also be that after receipt by the digital control unit 1, the sensor data 12 and/or the user control command data 18 are protected from external manipulation. As an alternative or in addition, the same is proposed for the local data storage 4 as well. All this may be done by control measures or by mechanical measures. The control measures may, for example, be a specific design of the control software and/or the safety software, such that access to the respective data is not possible via the user interface 17. Mechanical measures in this sense are to design the digital control unit 1 altogether in a mechanically robust fashion.

In the bioprocess control routine 19, as noted above, the digital control unit 1 generates the bioprocess data 16 based on the sensor data 12 and/or the actuator data 8 and/or the user control command data 18. According to the easiest approach, these data are sequentially arranged based on specific rules, that define, which of these data are to be assigned to the documentation data 23. In some embodiments, each data item of the bioprocess data 16 comprises at least the above noted, individual time stamp, a data item name and a data item value.

Generally it can be that the generation of the bioprocess data 16 is done continuously, such as periodically with a period defined with relation to time or data volume. In addition, the step of grouping the bioprocess data 16 into data blocks $d_i$ during the documentation routine 22 can be done continuously as well. Also the hashing of the data blocks $d_i$ during the documentation routine 22 can be performed continuously. This continuous generation of bioprocess data 16, grouping into data blocks $d_i$ and hashing is advantageous, as the time frame, in which manipulation of data is still possible, is narrowed to a minimum.

As a result of the above, it is to be expected, that for an individual time stamp, a whole number of bioprocess data items exist, which have to be arranged in the bioprocess data 16. In order to ensure a deterministic generation of the bioprocess data 16, in some embodiments, the data items of the bioprocess data 16 of the same individual time stamp are arranged in the bioprocess data 16 according to a predefined, total order function, for example a predefined sorting function.

According to another approach, however, it is provided, that in the documentation routine 22, the digital control unit 1 or the external documentation unit d generates a link information regarding the logical relation between at least part of the sensor data 12 and/or the actuator data 8 and/or the user control command data 18 to each other and generates the bioprocess data 16 also based on the link information.

The digital control unit 1, as its core task, controls the bioprocess by communicating with the actuator 9, 10 and the sensor 13, 14, 15. For this, the digital control unit 1 is configured to execute a feedback routine for realizing a control loop as noted above thereby influencing the bioprocess. Such control loop may serve to keep certain sensor data 12 stable by controlling the actuator 9, 10 accordingly.

Here, the digital control unit 1 has a casing 27, which should be robust as also noted above in order to prevent manipulation. As an alternative or in addition, the digital control unit 1 is a mobile unit that can be moved with the local processor unit 5 and the local data storage 4 through a laboratory. Again as an alternative or in addition, it is provided, that the local processor unit 5 and the local data storage 4 are connected via, here electrical, cables and/or short range wireless communication to the sensor 13, 14, 15 and/or the actuator 9, 10. Again, as an alternative or in addition, the user interface 17 may well comprise a user display and a user input device, in particular a touch screen, each of which are located in or on the casing 27 of the digital control unit 1.

In some embodiments, the bioprocess interface 6 comprises a direct, electrical data-wise connection to the sensor 13, 14, 15 and/or the actuator 9, 10. This further reduces opportunities to manipulate data within the connection. Regarding the definition of the expression "direct", reference is made to the above.

In some embodiments, the digital signature 26 generated by signing the documentation data 23 is stored in the local data storage 4. The digital control unit 1, as an alternative or in addition, may comprise a data transmission interface 28, wherein the digital control unit 1 transmits the digital signature 26 and/or the documentation data 23 and/or the bioprocess data 16 or parts of the respective data to an external data storage 29, which generally may be a process control system, which itself may well be another digital control unit. Here, the external data storage 29 is a so called "multifermenter" control system (MFCS), which comprises a local processor unit and a local data storage itself. The MFCS also provides a centralized process management system, dispatching requests to the digital control unit 1, which, however, does not play a role for various embodiments.

In some embodiments, the external documentation unit d and/or the external signing unit s is provided by a laboratory process control system 30 or a cloud service instance 31. Both alternatives are displayed in FIG. 1, while in FIG. 2, only the alternative of the documentation unit d and/or the signing unit s being provided by a cloud service instance 31 is displayed. This shows the high degree of flexibility in view of realizing the signing routine.

The proposed solution is particularly advantageous in a situation, in which bioprocess data, that have been generated in a biotechnological environment during the bioprocess, shall be transmitted from a sender to a recipient. As an example, at least the bioprocess data 16 as well as the digital signature 26, are being sent to the recipient. The sender may be the operator of the biotechnological environment, in which the respective bioprocess has been executed. The recipient may be a governmental organisation applying a compliance procedure to the bioprocess in question.

Based on the digital signature 26 of the of the documentation data 23, the recipient of the bioprocess data 16 is able to verify the integrity of these bioprocess data 16. For this, the public key, which corresponds to the cryptographic private key 25, has also to be made available to the recipient. The public key may be provided by the sender of the bioprocess data 16 directly to the recipient or using a trusted key infrastructure (TKI).

With the above noted public key, the recipient may decrypt the digital signature 26 to receive the documentation data 23, which may be the hash root h0 or the complete hash tree H shown in FIG. 3a). Now applying the respective hash function to the received bioprocess data 16 leads to a hash tree, which is called the "verification hash tree V" in the following and which is shown in FIG. 3b).

Figure 3:
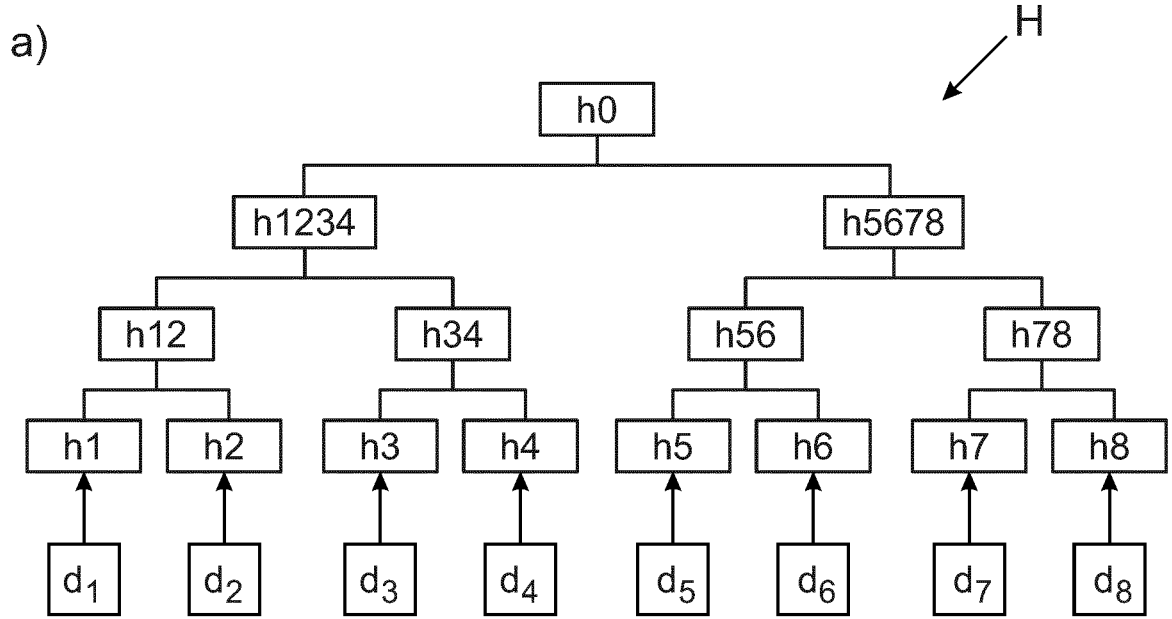
Figure 3:
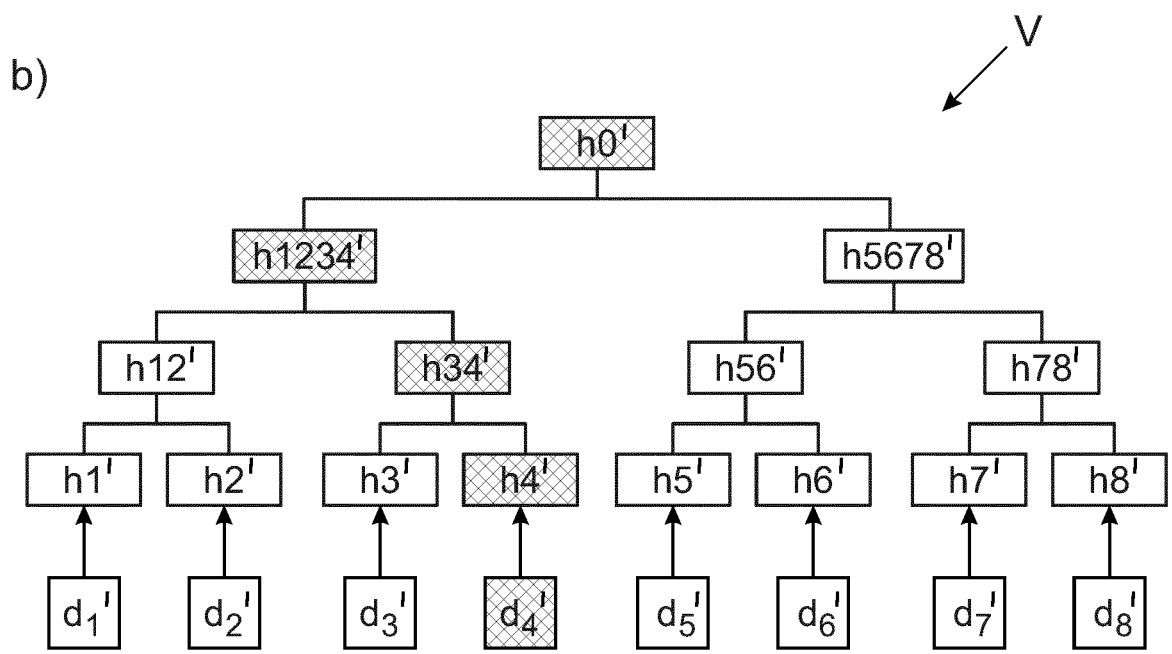

However, in the example shown in FIG. 3, the bioprocess data $d_4$ has been manipulated, which leads to the hashes h4', h34', h1234' and h0' being different from the hashes of the original hashes h4, h34, h1234 and h0. If the documentation data 23 are only based on the hash root h0, the recipient knows, that at least some data block $d_i$ is corrupted. If the documentation data 23 are only based on the complete hash tree H, the recipient may even derive by comparing the hash tree H to the verification hash tree V that data block $d_4$ is corrupted.

The above noted example shows, that by having the digital control unit 1 control the signing routine, verification of the data integrity is possible with high reliability and at the same time with high flexibility in terms of the signing process itself.

According to various embodiments, the digital control unit 1 is provided as such, which is configured to perform the proposed method. All explanations given before are fully applicable to this teaching.

According to another teaching, a control system with a proposed digital control unit 1 and an external documentation unit d and/or an external signing unit s is proposed as such. Again, reference is made to all explanations given before.

Finally, various embodiments are directed to the data processing system for the realization of the above noted method, in some embodiments comprising the local data storage 4 and the local processor unit 5, to a computer program product for the data processing system and to a computer readable storage media, on which the computer program product is stored.

The invention claimed is:

1. A method for conducting a bioprocess with a digital control unit of a bioprocess arrangement,
    wherein the digital control unit comprises a local data storage and a local processor unit,
    wherein the digital control unit comprises a bioprocess interface that sends and receives bioprocess control data,
    wherein the bioprocess interface comprises an actuator interface for sending actuator data to at least one actuator for influencing the bioprocess, the method comprising:
    receiving, with a sensor interface of the bioprocess interface sensor data related to the bioprocess from at least one sensor,
    generating, by the digital control unit, bioprocess data,
    displaying to a user at least part of the bioprocess data and receiving user control command data with a user interface of the digital control unit,
    executing a bioprocess control routine by the local processor unit to control the bioprocess,
    wherein in the bioprocess control routine, the sensor data are received by the digital control unit from the sensor,
    wherein in the bioprocess control routine, the actuator data are generated by the digital control unit based on the user control command data and/or the sensor data and the actuator is controlled by the digital control unit by sending the actuator data to the actuator thereby influencing the bioprocess,
    wherein in the bioprocess control routine, the bioprocess data are generated by the digital control unit from the actuator data and/or the sensor data and/or the user control command data, wherein private key data are stored in an external signing unit,
    that a data safety routine is initiated by the local processor unit,
    that a documentation routine is initiated by the local processor unit in the data safety routine to be executed by the local processor unit or an external documentation unit, that in the documentation routine, documentation data are generated from the bioprocess data by the local processor unit or the external documentation unit,
    that a signing routine is initiated by the local processor unit in the data safety routine to be executed by an external signing unit and that in the signing routine, a cryptographic private key is extracted from the private key data by the external signing unit and that the documentation data are digitally signed by the external signing unit with the cryptographic private key by generating a digital signature.

2. The method according to claim 1, wherein the external documentation unit and/or the external signing unit is provided by a laboratory process control system or a cloud service instance.

3. The method according to claim 1, wherein the data connection between the digital control unit on the one hand and the external documentation unit and/or the external signing unit on the other hand is realized using a message authentication code.

4. The method according to claim 1, wherein the documentation routine comprises a step of grouping the bioprocess data into data blocks and a step of hashing the data blocks generating hashes of the data blocks and that the documentation data are generated from the hashes of the data blocks.

5. The method according to claim 1, wherein the documentation routine comprises a step of hashing the hashes of the data blocks in form of a tree structure into a hash root and that the documentation data are generated from the hash root.

6. The method according to claim 1, wherein the digital control unit initiates the documentation routine to be executed during control of the bioprocess in the bioprocess control routine.

7. The method according to claim 1, wherein the step of grouping the bioprocess data into data blocks and/or the step of hashing the data blocks is/are initiated with the start of the bioprocess.

8. The method according to claim 1, wherein during a single bioprocess the digital control unit continuously receives the sensor data from the sensor in the bioprocess control routine and continuously sends actuator data to the actuator thereby influencing the bioprocess and that the signing routine is initiated a first time and at least a further time, each time to be executed during a single bioprocess, wherein a subsequent signing routine, which is based on a subsequent bioprocess data set, is being executed subsequently to a previous signing routine, which is based on a previous bioprocess data set.

9. The method according to claim 8, wherein the respective previous bioprocess data set and the respective subsequent bioprocess data set are overlapping each other.

10. The method according to claim 8, wherein the digital control unit or the external documentation unit adds an identifier of the respective previous bioprocess data set to the respective subsequent bioprocess data set.

11. The method according to claim 1, wherein in the signing routine, the external signing unit adds time stamps to the documentation data.

12. The method according to claim 1, wherein after receipt by the digital control unit, the sensor data and/or the user control command data are protected from external manipulation, and/or, that the local data storage is protected from external manipulation.

13. The method according to claim 1, wherein in the bioprocess control routine, the digital control unit generates the bioprocess data based on the sensor data and/or the actuator data and/or the user control command data.

14. The method according to claim 1, wherein in the bioprocess control routine, the digital control unit generates a link information regarding a logical relation between at least part of the sensor data and/or the actuator data and/or the user control command data and generates the bioprocess data also based on the link information.

15. The method according to claim 1, wherein the digital control unit is configured to execute a feedback routine for realizing a control loop thereby influencing the bioprocess.

16. The method according to claim 1, wherein the digital control unit has a casing, that the local processor unit and the local data storage are completely located in or on the casing, and/or, that the digital control unit is a mobile unit that can be moved with the local processor unit and the local data storage through a laboratory, and/or, that the bioprocess interface is connected via cables and/or short range wireless communication to the sensor and/or the actuator and/or, that the user interface comprises a user display and a user input device located in or on the casing.

17. The method according to claim 1, wherein the bioprocess interface comprises a direct, electrical data-wise connection to the sensor and/or the actuator.

18. The method according to claim 1, wherein the digital signature generated by signing the documentation data is received from the digital control unit via the bioprocess interface and stored in the local data storage, and/or, that the digital control unit initiates the transmission of the digital signature and/or the documentation data and/or the bioprocess data or parts of the respective data to an external data storage via the data transmission interface.

19. A digital control unit of a bioprocess arrangement for controlling a bioprocess,
   wherein the digital control unit comprises:
   a local data storage and a local processor unit,
   a bioprocess interface for sending and receiving bioprocess control data,
   an actuator interface for sending actuator data to at least one actuator for influencing the bioprocess,
   a sensor interface for receiving sensor data related to the bioprocess from at least one sensor,
   wherein the digital control unit generates bioprocess data,
   wherein the digital control unit further comprises a user interface for displaying to a user at least part of the bioprocess data and for receiving user control command data,
   wherein the digital control unit is configured to execute a bioprocess control routine via the local processor unit to control the bioprocess,
   wherein in the bioprocess control routine, the digital control unit receives the sensor data from the sensor,
   wherein in the bioprocess control routine, the digital control unit generates the actuator data based on the user control command data and/or the sensor data and controls the actuator by sending the actuator data to the actuator thereby influencing the bioprocess,
   wherein in the bioprocess control routine, the digital control unit generates the bioprocess data from the actuator data and/or the sensor data and/or the user control command data,
   wherein private key data are stored in an external signing unit,
   that the digital control unit is configured to initiate a data safety routine via the local processor unit,
   that the digital control unit is configured to initiate a documentation routine via the local processor unit in the data safety routine to be executed by the local processor unit or an external documentation unit, that in the documentation routine, the local processor unit or the external documentation unit generates documentation data from the bioprocess data,
   that the digital control unit is configured to initiate a signing routine via the local processor unit in the data safety routine to be executed by an external signing unit and that in the signing routine, the external signing unit extracts a cryptographic private key from the private key data and digitally signs the documentation data with the cryptographic private key by generating a digital signature.

20. A control system with a digital control unit according to claim 19 and an external documentation unit and/or an external signing unit to execute a method for conducting a bioprocess with a digital control unit of a bioprocess arrangement.

21. A data processing system comprising a processor configured for performing the method according to claim 1.

22. A non-transitory computer readable storage media that has a computer program that when executed performs the steps of claim 1.

* * * * *